United States Patent [19]
Peterson

[11] Patent Number: 5,191,731
[45] Date of Patent: Mar. 9, 1993

[54] FISHING LURE BODY

[76] Inventor: Charles E. Peterson, 273 Shore Dr., St. Helens, Oreg. 97051

[21] Appl. No.: 760,613

[22] Filed: Sep. 16, 1991

[51] Int. Cl.⁵ ............................................. A01K 85/00
[52] U.S. Cl. ................................... 43/42.36; 43/44.92
[58] Field of Search .................. 43/44.89, 44.9, 44.91, 43/42.36, 42.38, 42.45, 42.49, 42.24, 44.92, 44.95

[56] References Cited

U.S. PATENT DOCUMENTS

| | | | |
|---|---|---|---|
| 327,100 | 9/1885 | Palm | 43/44.91 |
| 1,497,019 | 6/1924 | Hennings | 43/42.49 |
| 2,722,769 | 11/1955 | Blockinger | 43/44.91 |
| 2,983,068 | 5/1961 | Grayson | 43/44.89 |
| 3,293,792 | 12/1966 | Bittaker | 43/44.91 |
| 3,415,003 | 12/1968 | Hudeley | 43/44.89 |
| 3,608,230 | 9/1971 | Hribar | 43/44.89 |
| 4,145,833 | 3/1979 | Ratte | 43/44.91 |
| 4,279,092 | 7/1981 | Hutson | 43/44.89 |

FOREIGN PATENT DOCUMENTS

| | | | |
|---|---|---|---|
| 0610687 | 6/1926 | France | 43/44.95 |
| 1097823 | 7/1955 | France | 43/44.89 |
| 1433142 | 4/1976 | United Kingdom | 43/42.24 |

Primary Examiner—Richard K. Seidel
Assistant Examiner—James Miner
Attorney, Agent, or Firm—James D. Givnan, Jr.

[57] ABSTRACT

A lure body is disclosed as having a slot in communication with a central opening in the lure body to permit attachment of the lure body to a leader or fish line by lateral passage into and through the slot into the opening. The slot width is restricted to prevent all but intentional manipulation of the leader or fish line through the slot in order that the lure body says on the leader or fish line during fishing. The wall surfaces are chamferred to facilitate line entry into the slot.

2 Claims, 1 Drawing Sheet

FISHING LURE BODY

BACKGROUND OF THE INVENTION

The present invention pertains generally to fishing lures with interchangeable components.

Certain types of lure bodies have central openings formed therein for receiving a line, wire segment or leader as for example the inclusion of glass beads in a lure. Such beads come in an array of sizes and colors and are slid into place on a wire component of the lure. Such bead use is considered permanent as the beads are not removable without disassembly of the lure.

As mentioned above, certain types of lures are centrally apertured for the passage of a line or leader with the lure being movable along and about a segment of line or leader. Such lures rotate about the line or leader in response to water moving past the lure.

A drawback of the above noted lures and components is that they are not readily removable to permit substitution of a similar body of different color and/or size. Typically, the user must remove the line from the lure which entails untying or cutting of the line or leader, reinserting the cut end into a new component of different shape and/or color and thereafter securing the line or leader to the remaining portion of the lure. Such an effort is not readily performed when on location at a fishing site.

SUMMARY OF THE PRESENT INVENTION

The present invention is embodied within the lure component having a slotted portion which permits both mounting as well as removal of a lure or lure component from a lure by lateral displacement of the component from an elongate component.

A slot is defined by the present lure body and is of a width normally less than the diameter of the elongate lure member (line, leader, wire) passing therethrough. Accordingly, during use of the lure, the present component is prevented from undesired separation with removal from the lure accomplished only by intentional forcing of the lure body in a lateral direction. During such removal, as well as during installation, a portion of the lure body is momentarily compressed to permit passage of the line, leader or wire. Materials used for lures include foamed materials which permit momentary deformation and/or compression during removal or installation with the material thereafter returning to a normal configuration.

Important objectives include the provision of a lure body which defines a laterally extending slotted area through which an elongate member such as a leader, line or wire may be urged to permit removal as well as installation of a lure body without untying of the lure or disassembly; the provision of a lure body of yieldable material wherein slot defining walls of the component are chamferred to facilitate entry of an elongate member into the slotted portion of the lure; the provision of a lure body which may readily be quickly removed and substituted for by a second lure component of a different color and shape without disassembly of the lure.

DETAILED DESCRIPTION OF THE PREFERRED EMBODIMENTS

Figure 1:
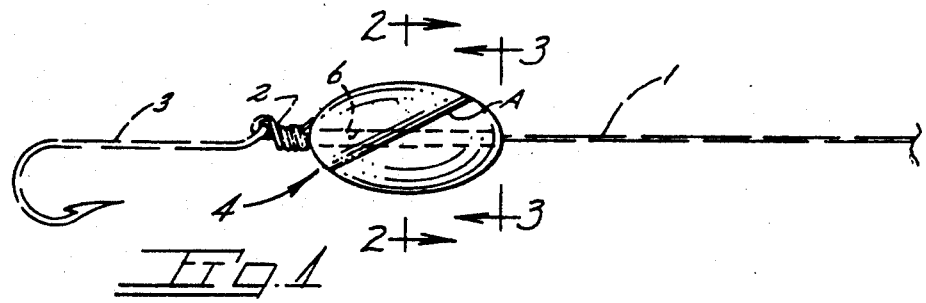
FIG. 1 is a side elevational view of the present lure body in place on a segment of leader.
Figure 2:
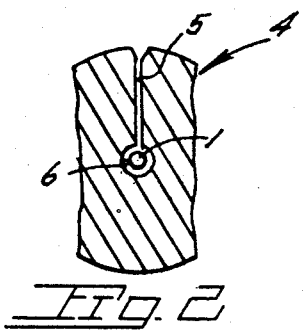
FIG. 2 is a vertical sectional view of the component taken along line 2—2 of FIG. 1 with fragments broken away.
Figure 3:
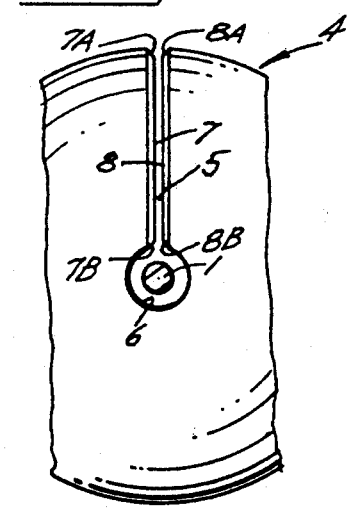
FIG. 3 is an enlarged, end elevational view of the lure body taken along line 3—3 of FIG. 1.

With continuing attention to the drawing wherein applied reference numerals indicate parts similarly hereinafter identified, the reference numeral 1 indicates a segment of leader or fishing line which terminates in attachment at 2 to a fish hook 3.

Indicated generally at 4 is a monolithic lure body of three-dimensional ovoid configuration and embodying one form of the invention. The body may be of various shapes and colors with appendages shown oppositely disposed as at A or devoid of appendages. Appendages, if utilized, may take various forms, as for example, the inclined wing projections shown.

The form of the invention shown in FIG. 1 is adapted for placement on leader 1 by means of a narrow slot 5 for lateral passage of the leader into an opening 6 at the inner end of slot 5. Opening 6 in the lure body is of a cross section greater than the cross section of leader 1 to permit rotation of the lure body, if desired, about the leader.

To facilitate installation of lure body 4 onto the leader, defining slot wall surfaces at 7 and 8 preferably terminate outwardly in chamfers 7A-8A. Similarly additional or inner chamfers at 7B and 8B facilitate entry of the leader 1 into slot 5 during removal of the body from the leader.

Figure 4:
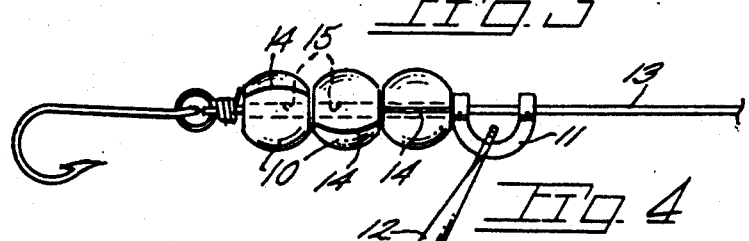
FIG. 4 is a side elevational view of a modified form of the present invention.

With attention to FIG. 4 it will be seen that the present invention may also be utilized on beads 10 such as those of a size and shape for use as bearings to support a rotating clevis 11 which attaches a lure member 12 to a wire segment 13 of a fishing lure. Bead components, in addition to reducing friction of moving lure member 12 are colored to attract fish and accordingly it is highly desirable to provide beads which are interchangeable to permit replacing beads with beads of different color and/or size to best suit current fishing conditions. Toward this end a slot 14 in each bead extends inwardly to a central opening 15 extending through the bead to receive wire segment 13. As in the first described form of the invention, the slot 14 is of lesser width than the elongate member i.e., wire segment 13 to require some degree of force both to install the bead and to remove the bead. The opening 15 is of a larger cross section than segment 13 to permit the bead to serve as a friction reducing member for lure 12 and clevis 11.

Suitable nonmetallic materials for the monolithic lure body may include polyurethane foam, polystyrene foam, cork, balsa wood all of which have a degree of resiliency and may be formed with or provided later with a slot through which an elongate member such as leader, a fish line, a wire lure component may be urged with the surfaces of the slot momentarily deforming or yielding during inward and outward passage of the elongate member.

Figure 5:
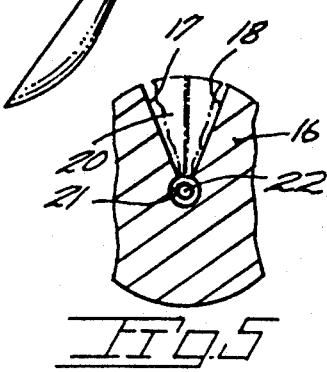
FIG. 5 is a fragmentary sectional view of a modified form of the present invention wherein a slot is of nonuniform width.

In FIG. 5 a modified form of the line body at 16 includes internal wall surfaces 17-18 defining a V- shaped slot 20 which terminates inwardly in a central opening 21 to receive an elongate member 22 of lesser cross section than the opening 21. The lure body 16 is of a malleable nature to permit closing of the slot without substantially reducing the size of opening 21. One suitable material for lure body 16 is a malleable metal such as lead.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

I claim:

1. In combination, an elongate member having a fishhook at one end, a nonmetallic fishing lure body of monolithic construction for attachment to said elongate member, said body including, a central portion defining an axial opening of a cross section greater than that of the elongate member to receive the elongate member in a loose manner, said axial opening comprising means for allowing rotation of said lure body about said elongate member when the lure body is drawn through the water, internal wall surfaces of said body defining a slot in communication with said opening, said wall surfaces spaced apart a distance less than the maximum cross sectional dimension of the opening and less than the cross section of the elongate member for retention of the elongate member in said opening, and said body of a material having a degree of resiliency to permit momentary deformation of the wall surface during lateral passage of the elongate member therealong.

2. The fishing lure body claimed in claim 1 additionally including a wing appendage on said body inclined to said opening to impart rotation to the lure body when the lure body is drawn through the water.

* * * * *